Nov. 7, 1950 — R. B. WHITNEY — 2,528,628
VENTILATED UNDERWATER INTERNAL-COMBUSTION ENGINE
Filed May 14, 1945 — 3 Sheets-Sheet 1
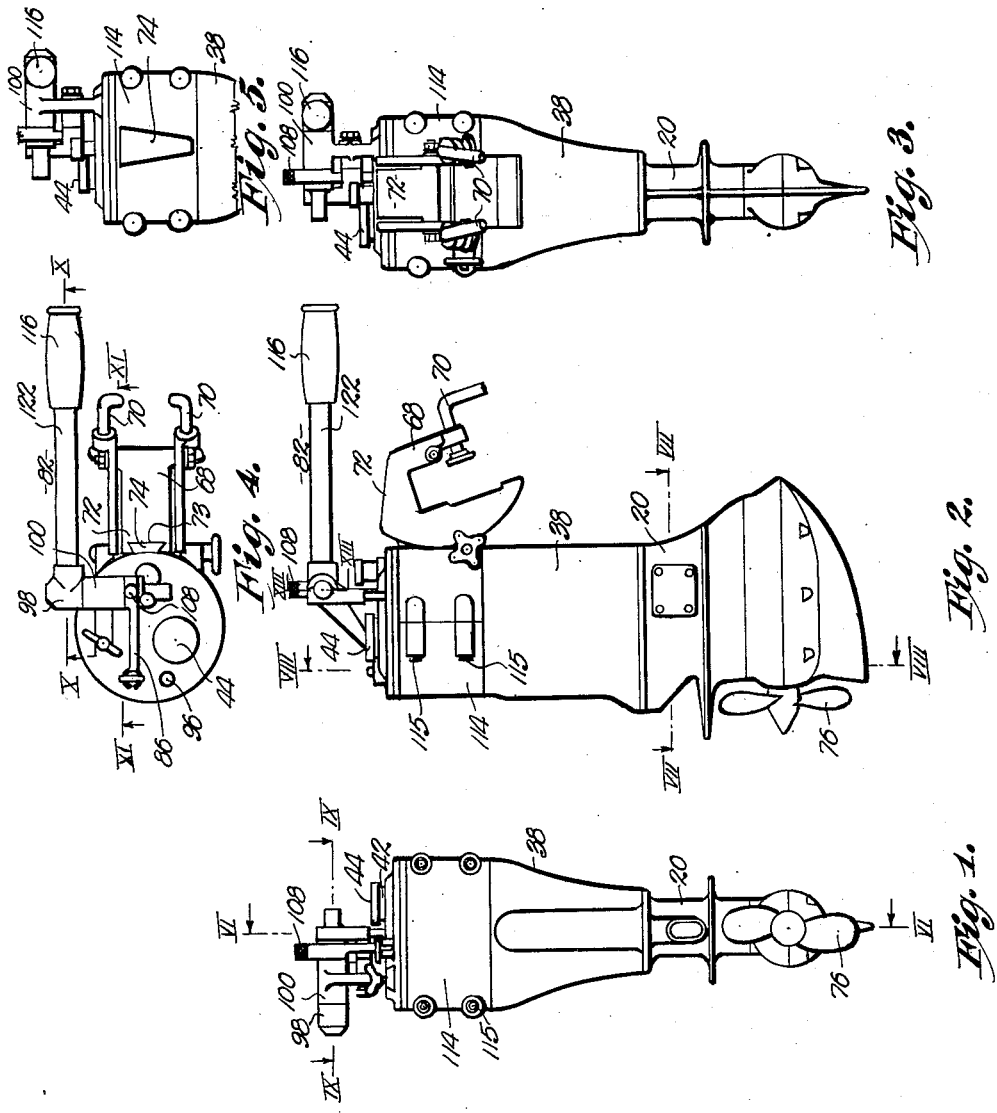
INVENTOR.
Robert B. Whitney
BY
ATTORNEY Nov. 7, 1950   R. B. WHITNEY   2,528,628
VENTILATED UNDERWATER INTERNAL-COMBUSTION ENGINE
Filed May 14, 1945   3 Sheets-Sheet 2
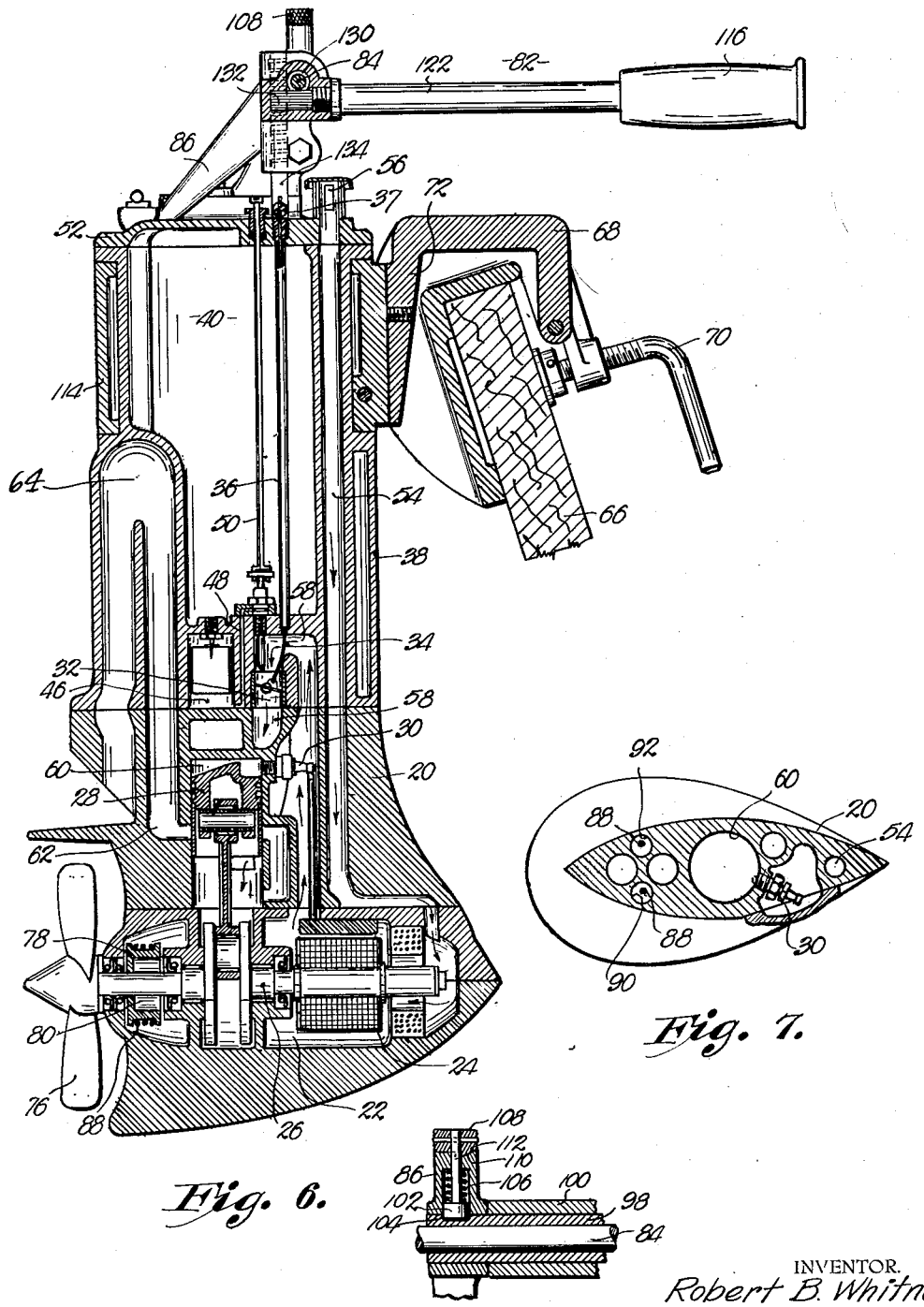
Fig. 6.
Fig. 7.
Fig. 13.
INVENTOR.
Robert B. Whitney
BY 
ATTORNEY Nov. 7, 1950  R. B. WHITNEY  2,528,628
VENTILATED UNDERWATER INTERNAL-COMBUSTION ENGINE
Filed May 14, 1945  3 Sheets-Sheet 3
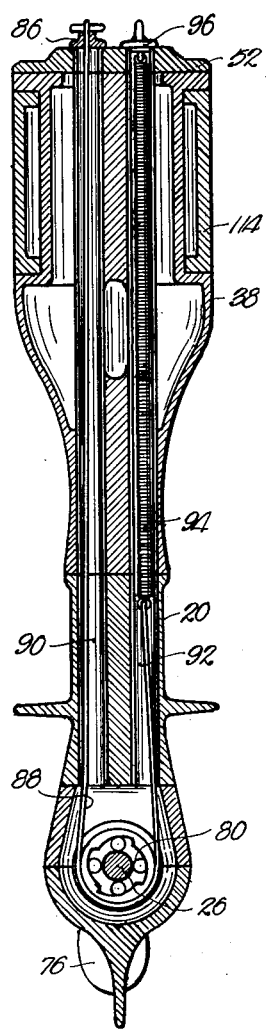
Fig. 8.
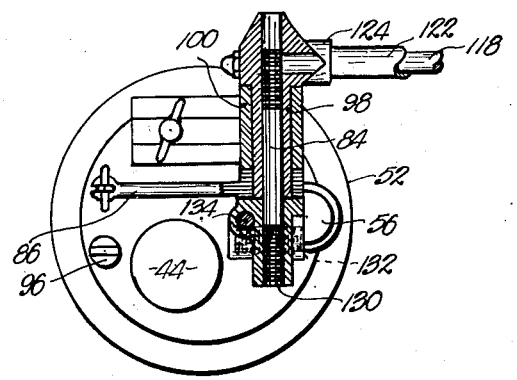
Fig. 9.
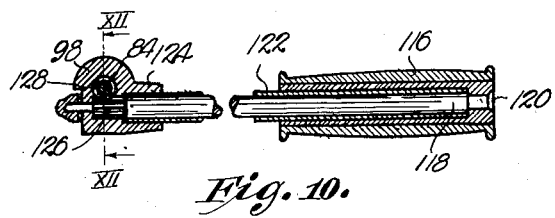
Fig. 10.
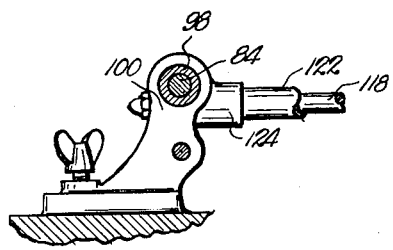
Fig. 11.
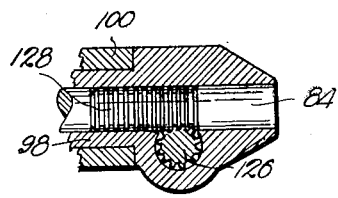
Fig. 12.
INVENTOR.
Robert B. Whitney
BY
ATTORNEY Patented Nov. 7, 1950

2,528,628

UNITED STATES PATENT OFFICE 2,528,628

VENTILATED UNDERWATER INTERNAL-COMBUSTION ENGINE

Robert B. Whitney, Kansas City, Mo., assignor of one-half to Wayne B. Weed, Kansas City, Mo.

Application May 14, 1945, Serial No. 593,583

13 Claims. (Cl. 115—18)

This invention relates to internal combustion engines of the outboard type and has for a primary aim to provide ventilating means for the component parts of the engine that are confined within the block thereof, which block is customarily submerged below the surface of the water when the engine is being employed to propel watercraft.

Another very important object of this invention is to provide an internal combustion engine with ventilating means for the parts thereof which are disposed within the engine block, which ventilating means not only serves to prevent the collection of condensate upon the housed parts of the engine, but to supply air to the carburetor, thereby to consume the fresh air and avoid the necessity of continuously cycling the same without making full use of all air entering the ventilating means.

A still further and important object of this invention is the provision of an internal combustion engine of the outboard type that is equipped with a steering lever, the character whereof is such as to control the flow of liquid fuel to the carburetor upon rotation of the lever about its longitudinal axis—all to the end that speed and direction of the craft with which the engine is associated, may be governed by a single part of the engine and through the employment of but one hand of the operator.

A yet further aim of this invention is to provide an outboard type internal combustion engine with structure for starting the same through manual manipulation of the steering lever, which structure is automatically maintained in a position and condition to rotate the crank shaft of the engine when the aforesaid lever is swung about an axis of rotation by a pumping action imparted by the operator.

Other objects of the invention will appear during the course of the following specification, referring to the accompanying drawing, wherein:

Fig. 1 is a rear elevational view of the ventilated, under-water internal combustion engine, made in accordance with the present invention.

Fig. 2 is a side elevational view thereof.

Fig. 3 is a front elevational view of the engine.

Fig. 4 is a top plan view.

Fig. 5 is a fragmentary rear elevational view of the upper portion of the engine with the supporting or attaching bracket removed therefrom.

Fig. 6 is an enlarged longitudinal central sectional view taken on line VI—VI of Fig. 1, looking in the direction of the arrows.

Fig. 7 is a cross sectional view taken on line VII—VII of Fig. 2.

Fig. 8 is a longitudinal sectional view taken along line VIII—VIII of Fig. 2.

Fig. 9 is a sectional view taken on line IX—IX of Fig. 1, looking in the direction of the arrows.

Fig. 10 is a fragmentary detailed sectional view taken on line X—X of Fig. 4.

Fig. 11 is a fragmentary detailed sectional view taken through the uppermost portion of the engine and on line XI—XI of Fig. 4.

Fig. 12 is an enlarged fragmentary detailed sectional view taken on line XII—XII of Fig. 10; and Fig. 13 is an enlarged fragmentary sectional view taken on line XIII—XIII of Fig. 2, looking in the direction of the arrows.

It is well-known in the art and the industry recognizes the advantages arising from employing under-water engines for surface craft, and the broad idea of submerging the major portion of an engine block, is not new. Through the employment of submerged engines, however, a number of difficulties have arisen to render the operation thereof less efficient than it would be if moisture which collects on the component parts of the submerged engine and within the block thereof, was not present. This moisture is detrimental not only to the electrical equipment of the submerged engine, but has deteriorating effects upon the units that cannot be ventilated and kept dry.

The engine chosen to illustrate the features of my invention comprises a block 20 having an irregular cavity 22 formed therein to contain most of the component parts that generate power, which parts include a generator broadly designated by the numeral 24, a crank shaft 26, a piston 28, and a spark plug 30 operably and electrically connected to generator 24, all as clearly illustrated in Fig. 6.

The carburetor 32 has an operating cable 34 extending upwardly through a conduit 36 to a connection with shaft 37, as illustrated in Fig. 6. A member 38 in the form of a casting or similarly constructed as block 20, is disposed immediately above the block and provided with a compartment 40 serving as the fuel tank, access to which is gained through a filler neck 42 covered by cap 44. The bottom of compartment 40 communicates with carburetor 32 by way of float chamber 46 and passage 48. The size of this passage 48 and therefore, the amount of liquid fuel reaching carburetor 32 is governed by the adjustable rod 50 extending upwardly through the head 52 on member 38.

A conduit 54 provided in member 38 and continuing into block 20, is in communication with cavity 22 as clearly illustrated in Fig. 6. This conduit connects with cavity 22 near the forward end thereof and is open to the atmosphere as at 56, to the end that outside air is drawn into cavity 22 of block 20 as the parts disposed within cavity 22 are operated. A passage 58 extends upwardly through a portion of block 20 and the lower part of member 38 and joins with carburetor 32 to supply that member with the proper amount of air for the combustion mixture. Obviously, the air and fuel drawn into the cylinder 60 will be exhausted through port 62 and thence exhaust outlet passage 64 as the engine is in operation.

The generator 24 will be constantly bathed with fresh air entering conduit 54 and no condensate nor moisture will collect thereon to form shorts or other detrimental results.

The engine assembly is mounted upon the boat or other craft with which it is to be used, and the fragmentary illustration of a portion of a boat 66 indicates the manner in which the bracket 68 is employed to secure the outboard type engine in place. Bracket 68 is provided with a pair of setting clamps 70 and the head 72 having a substantially V-shaped socket 73 into which wedge-shaped base 74 is adapted to seat. Thus, a tight engagement is effected by bracket 68 and member 38 which may be broken by lifting the entire engine assembly, with the exception of bracket 68.

Crank shaft 26 is rotated by piston 28 and propeller 76, mounted on said shaft 26 is thereby brought into play as is well understood. This crank shaft 26 has a drum 78 mounted thereon as illustrated in Figs. 6 and 8. An over-riding clutch 80 establishes connection between crank shaft 26 and drum 78 for the purpose of allowing the crank shaft to freely rotate when the over-riding clutch 80 is not functioning.

The engine may be started by pumping lever 82, the character whereof is unique in that its manipulation about the axis of shaft 84 will rock or oscillate the outer free end of arm 86, that is attached to one end of cable 88 disposed as clearly shown in Fig. 8. Two spaced apart side-by-side tubular ways 90 and 92 formed in member 38 and block 20, communicate with that portion of cavity 22 wherein drum 78 is housed. The cable passes around drum 78 to frictionally engage its periphery between the flanges integral therewith, and thence enters way 92 to join one end of spring 94, the upper end whereof is secured to plug 96 on the top of head 52. As lever 82 is moved through a pumping action, over-riding clutch 80 will grip crank shaft 26 in response to a tightening of cable 88 thereabout.

Arm 86 is removably attached to sleeve 98 that is rigid to lever 82 and journalled within bearing 100 on head 52. When it is desired to interconnect arm 86 and sleeve 98, the quickly adjustable connection, shown in Fig. 13, is actuated. A plunger 102 enters socket 104 in sleeve 98 and therein maintained by spring 106 so long as cap 108 is in the position illustrated in Fig. 13, where the interengaging cam faces 110 and 112 on a portion of arm 86 and cap 108 allow the lowering of plunger 102 to the locked position. As soon as the engine has been started arm 86 is disengaged from lever 82 by turning cap 108 to withdraw plunger 102 from socket 104. Any up and down movement of lever 82 therefore, will not be imparted to arm 86 while the lever is being used to rotate the entire engine assembly to guide the craft with which the engine is associated. The steering axis in this outboard engine, is disposed at the longitudinal center of the member 38 for split collar 114, held in place by bolts 115, circumscribes the member in a groove formed for the purpose.

Lever 82 is provided with a rotatable grip 116, rigid to shaft 118 by being riveted thereto as at 120. Tube 122 circumscribes shaft 118 and extends from grip 116 to boss 124 on sleeve 98. This tube 122 does not rotate with grip 116 and shaft 118 but insures protection to shaft 118. The inner end of shaft 118 has a pinion 126 developed thereon which meshes with rack 128 on shaft 84. This rack and pinion arrangement is such as to cause shaft 84 to shift axially when shaft 118 is turned about its longitudinal axis by the manipulation of grip 116.

Shaft 84 has another rack 130 in mesh with a transverse pinion 132 formed with teeth to engage shaft 134 carried in bearing 100 for rectilinear longitudinal reciprocation. It is this movement that is imparted to cable 34 operably joined to carburetor 32. It is clear, therefore, that when the operator turns grip 116 in either direction about the axis of shaft 118, that movement will be transmitted through shaft 84, transverse pinion 132, shaft 134 and cable 34 to carburetor 32.

The form of the interengaging racks and pinions and the manner of mounting lever 82 is such as to permit both steering and carburetor manipulation when the lever is in any angular position with respect to its axis of rotation within bearing 100 and about the axis of shaft 84.

The engine can be successfully operated, therefore, with lever 82 in any radial condition from that illustrated in Fig. 6 to a position diametrically opposite. The flexibility of such parts as have above been described is an advantageous step forward in the art. Convenience and ease of manipulation is allowed and the engine may be operated by less experienced persons without the customary detrimental effects.

Outboard internal combustion engines of the under-water type, having physical characteristics different from those illustrated and above described, may be produced without departing from the spirit of the invention or scope of the appended claims.

Having thus described the invention, what is claimed as new and desired to be secured by Letters Patent is:

1. In an outboard motor, an internal combustion engine having a cylinder block wherein is disposed ignition apparatus including a generator; a bracket for operably supporting the engine in place with the block below the surface and in direct contact with the water; and a conduit formed in the block with one end thereof open to the atmosphere to conduct air to and from the ignition apparatus and thereby ventilate the same.

2. In an outboard motor, an internal combustion engine having a cylinder block wherein is disposed a carburetor, a bracket for operably supporting the engine in place with the block below the surface and in direct contact with the water, a conduit having one end thereof open to the atmosphere to conduct air to the carburetor, circulation of the air in through the conduit being maintained by suction due to engine operation and a generator in the conduit whereby said air entering the conduit serves to ventilate the generator and thereby precludes formation of condensate and moisture therein.

3. In an outboard motor, an internal combustion engine having a cylinder block wherein is disposed a carburetor; a bracket for operably supporting the engine in place with the block below the surface and in direct contact with the water; and a steering lever rotatably mounted on the block; and parts operable upon rotation of the lever about its longitudinal axis for controlling the flow of fuel through the carburetor.

4. In an engine of the character described having a block wherein is disposed the component parts thereof including a carburetor; a bracket for operably supporting the engine in place with the block below the surface of the water; a steering lever mounted on the block; mechanism joining the steering lever and carburetor arranged to vary the flow of fuel through the carburetor upon rotation of the lever about its own longitudinal axis; and other mechanism joining the crankshaft of the engine and the lever arranged to rotate the crankshaft to start the engine upon movement of the lever about an axis of rotation disposed substantially at right angles to the axis of rotation of the engine when manipulating the lever for steering purposes.

5. In an engine of the character described having a block wherein is disposed the component parts thereof; a bracket for operably supporting the engine in place with the block below the surface of the water; a steering lever mounted on the block; and mechanism joining the crankshaft of the engine and the lever arranged to rotate the crankshaft to start the engine upon movement of the lever about an axis of rotation disposed substantially at right angles to the axis of rotation of the engine when manipulating the lever for steering purposes, said mechanism comprising an arm rigid to the lever, a drum on the engine crankshaft, a cable wound around the drum with one end anchored to the said arm, and a spring yieldably holding the opposite end of the cable in constantly taut condition, whereby upon reciprocation of the lever and said arm about the said first mentioned axis, the cable will spin the crankshaft in one direction.

6. In an engine of the character described having a block wherein are disposed the component parts thereof; a bracket for operably supporting the engine in place with the block below the surface of the water; a steering lever mounted on the block; and mechanism joining the crank shaft of the engine and the lever arranged to rotate the crank shaft to start the engine upon movement of the lever about an axis of rotation disposed substantially at right angles to the axis of rotation of the engine when manipulating the lever for steering purposes, said mechanism comprising an arm rigid to the lever, a drum on the engine crank shaft, a cable wound around the drum with one end anchored to the said arm, and a spring yieldably holding the opposite end of the cable in a constantly taut condition, whereby upon reciprocation of the lever and said arm about the said first mentioned axis the cable will spin the crank shaft in one direction, said arm having a manually operable clutch forming a connection with the lever.

7. In an outboard motor, an internal combustion engine having a carburetor, an air intake duct for the carburetor, said duct including at a point between the carburetor and the intake end of the duct a submerged chamber whose exterior walls are in direct contact with the water, and ignition means for the engine including a generator situated in the chamber and ventilated by the flow of air therethrough to the carburetor.

8. In an outboard motor, an internal combustion engine having a cylinder block submerged in the water, a carburetor for the engine, an air intake duct for the carburetor, said duct including at a point between the carburetor and the intake end of the duct a submerged chamber whose exterior walls are in direct contact with the water, and ignition means for the engine including a generator situated in the chamber and a spark plug situated in the duct, whereby said generator and spark plug are ventilated by the flow of air to the carburetor.

9. In an outboard motor as claimed in claim 8 and an electrical conductor extending through said duct from said generator to said spark plug.

10. An internal combustion engine having a carburetor, an air intake duct for the carburetor, and ignition means including a generator situated in the duct and ventilated by the flow of air therethrough to the carburetor.

11. An internal combustion engine having a carburetor, an air intake duct for the carburetor, and ignition means including a generator and a spark plug both situated in the duct and ventilated by the flow of air therethrough to the carburetor.

12. In an outboard motor, an internal combustion engine having a substantially horizontal crank shaft, a propeller on one end of the crank shaft and a generator on the other end, a housing around the generator, a carburetor for the engine, and an air intake for the carburetor so constructed and arranged that air is drawn from above the surface of the water through the generator housing into the carburetor.

13. In an outboard motor for a boat, an internal combustion engine having a substantially horizontal crank shaft, a propeller secured to one end of the crank shaft, a steering lever connected to the engine for moving same relative to the boat for steering purposes, said lever being movable relative to the engine, a drum having a normal position, a cable wound around the drum and having one end connected to the steering lever so that the drum is rotated away from normal responsive to movement of said lever relative to the engine, an overriding clutch between the drum and the crank shaft for transferring the drum's rotation to the shaft, and spring means for restoring the drum to normal.

ROBERT B. WHITNEY.

REFERENCES CITED

The following references are of record in the file of this patent:

UNITED STATES PATENTS

| Number | Name | Date |
|---|---|---|
| 747,801 | Sturges | Dec. 22, 1903 |
| 1,571,421 | Lind | Feb. 2, 1926 |
| 1,804,442 | Smith | May 12, 1931 |
| 1,932,521 | Irgens | Oct. 31, 1933 |
| 2,155,112 | Anderson | Apr. 18, 1939 |
| 2,216,496 | MacKay | Oct. 1, 1940 |
| 2,241,379 | Franci | May 13, 1941 |
| 2,271,174 | MacKay | Jan. 27, 1942 |

FOREIGN PATENTS

| Number | Country | Date |
|---|---|---|
| 8,641 | Great Britain | Apr. 10, 1906 |
| 310,160 | Great Britain | Apr. 25, 1929 |